United States Patent
James et al.

(10) Patent No.: US 10,239,766 B2
(45) Date of Patent: Mar. 26, 2019

(54) EVAPORATOR SUMP AND PROCESS FOR SEPARATING CONTAMINANTS RESULTING IN HIGH QUALITY STEAM

(71) Applicants: Kenneth James, Calgary (CA); Bob Nabata, Calgary (CA)

(72) Inventors: Kenneth James, Calgary (CA); Bob Nabata, Calgary (CA)

(73) Assignee: Private Equity Oak LP, Alberta (CA)

( * ) Notice: Subject to any disclaimer, the term of this patent is extended or adjusted under 35 U.S.C. 154(b) by 519 days.

(21) Appl. No.: 14/601,792

(22) Filed: Jan. 21, 2015

(65) Prior Publication Data
US 2015/0203363 A1 Jul. 23, 2015

Related U.S. Application Data

(60) Provisional application No. 61/929,726, filed on Jan. 21, 2014.

(51) Int. Cl.
| | |
|---|---|
| C02F 1/04 | (2006.01) |
| C02F 1/08 | (2006.01) |
| B01D 1/06 | (2006.01) |
| B01D 1/28 | (2006.01) |
| C02F 103/36 | (2006.01) |
| C02F 101/32 | (2006.01) |

(52) U.S. Cl.
CPC .............. *C02F 1/041* (2013.01); *B01D 1/065* (2013.01); *B01D 1/28* (2013.01); *C02F 1/08* (2013.01); *C02F 1/048* (2013.01); *C02F 2101/32* (2013.01); *C02F 2103/365* (2013.01)

(58) Field of Classification Search
CPC .. C02F 1/04; C02F 1/041; C02F 1/048; C02F 1/08; C02F 2101/32; C02F 1/006; B01D 1/065; B01D 1/28; B01D 1/0064; B01D 1/04; B01D 1/228
See application file for complete search history.

(56) References Cited

U.S. PATENT DOCUMENTS

| | | |
|---|---|---|
| 1,617,082 A | 2/1927 | Price |
| 2,310,649 A | 2/1943 | Peebles |
| 2,920,039 A | 1/1960 | Miller |
| (Continued) | | |

FOREIGN PATENT DOCUMENTS

| | | |
|---|---|---|
| CA | 2 547 503 A1 | 6/2005 |
| CA | 2 609 859 A1 | 5/2009 |
| (Continued) | | |

*Primary Examiner* — Brian R Gordon
(74) *Attorney, Agent, or Firm* — Fay Sharpe LLP (57) ABSTRACT

A horizontal sump for producing high quality steam, includes at least one inlet, for connection to an evaporator, for receiving steam and contaminated water from the evaporator, the evaporator having a tube side and a shell side. The horizontal sump further includes at least one steam outlet for feeding steam to an evaporator compressor. The at least one steam outlet further includes at least one wash tray, for washing any entrained brine from the steam prior to introduction of the steam to the evaporator compressor, wherein the horizontal sump increases residence time of water and steam in the sump resulting in a steam of quality greater than that of the steam from the steam and contaminated water from the evaporator.

20 Claims, 5 Drawing Sheets

(56) References Cited

U.S. PATENT DOCUMENTS

| | | |
|---|---|---|
| 3,155,600 A | 11/1964 | Williamson |
| 3,778,969 A | 12/1973 | Sudduth |
| 3,819,054 A | 6/1974 | Long et al. |
| 4,002,538 A | 1/1977 | Pottharst, Jr. |
| 4,007,921 A | 2/1977 | Zingg |
| 4,120,158 A * | 10/1978 | Sheinbaum ............ F01K 21/005 60/641.3 |
| 4,269,776 A | 5/1981 | Keunecke et al. |
| 4,428,328 A | 1/1984 | Ratliff |
| 4,683,025 A | 7/1987 | Flores |
| 4,880,533 A | 11/1989 | Hondulas |
| 4,924,936 A | 5/1990 | McKown |
| 4,938,876 A | 7/1990 | Ohsol |
| 5,195,587 A | 3/1993 | Webb |
| 5,221,439 A | 6/1993 | Li et al. |
| 5,236,605 A | 8/1993 | Warncke |
| 5,303,725 A | 4/1994 | Hilgren |
| 5,415,673 A | 5/1995 | Hilton et al. |
| 5,456,823 A | 10/1995 | Lermite et al. |
| 5,516,119 A | 5/1996 | Trackwell et al. |
| 5,762,416 A | 6/1998 | LeSire |
| 5,906,714 A | 5/1999 | Gramkow et al. |
| 5,948,242 A | 9/1999 | Ohsol et al. |
| 6,019,818 A | 2/2000 | Knapp |
| 6,199,834 B1 | 3/2001 | Popov et al. |
| 6,234,760 B1 | 5/2001 | Popov et al. |
| 6,244,098 B1 | 6/2001 | Chen et al. |
| 6,315,000 B1 | 11/2001 | Goodyear |
| 6,418,957 B1 | 7/2002 | Goodyear |
| 6,536,523 B1 | 3/2003 | Kresnyak et al. |
| 6,938,583 B2 | 9/2005 | Wood |
| 7,306,057 B2 | 12/2007 | Strong et al. |
| 7,326,285 B2 | 2/2008 | Chowdhury |
| 7,591,309 B2 | 9/2009 | Minnich et al. |
| 7,647,976 B2 | 1/2010 | Tsilevich |
| 7,670,573 B2 | 3/2010 | Stell et al. |
| 7,681,643 B2 | 3/2010 | Heins |
| 7,814,933 B2 | 10/2010 | Khang et al. |
| 2002/0043289 A1 | 4/2002 | Goodyear |
| 2002/0088703 A1 | 7/2002 | Walker |
| 2002/0184784 A1 | 12/2002 | Strzala |
| 2007/0007172 A1 | 1/2007 | Strack et al. |
| 2007/0051513 A1 | 3/2007 | Heins |
| 2008/0093264 A1 | 4/2008 | Sarkar et al. |
| 2008/0110630 A1 | 5/2008 | Minnich et al. |
| 2009/0008334 A1 | 1/2009 | Schoen et al. |
| 2009/0020456 A1 | 1/2009 | Tsangaris et al. |
| 2009/0084707 A1 | 4/2009 | Gil |
| 2010/0058771 A1 | 3/2010 | Gil et al. |
| 2010/0181184 A1 | 7/2010 | Bahr |
| 2011/0036308 A1 | 2/2011 | Betzer-Zilevitch |
| 2011/0061816 A1 | 3/2011 | Duesel, Jr. et al. |
| 2011/0089013 A1* | 4/2011 | Sakurai ............ B01D 17/0205 201/2 |
| 2012/0000642 A1 | 1/2012 | Betzer Tsilevich |
| 2012/0179624 A1 | 7/2012 | Berry et al. |
| 2012/0192716 A1 | 8/2012 | Chen et al. |
| 2014/0144788 A1* | 5/2014 | Barton ................... C22L 33/02 205/704 |

FOREIGN PATENT DOCUMENTS

| | | |
|---|---|---|
| CA | 2 610 052 A1 | 5/2009 |
| WO | WO 2005/054746 A2 | 6/2005 |
| WO | WO 2008/098242 A2 | 8/2008 |

* cited by examiner

EVAPORATOR SUMP AND PROCESS FOR SEPARATING CONTAMINANTS RESULTING IN HIGH QUALITY STEAM

PRIORITY

This application claims the benefit of Provisional Application Ser. No. 61/929,726 which was filed on Jan. 21, 2014. The subject matter of that application is incorporated hereinto in its entirety.

FIELD

The present disclosure relates to the better separation of vapour, brine and/or hydrocarbons in a mechanical vapour recompression evaporator that utilizes falling film exchangers by incorporating a sump design resulting in high quality steam and better quality steam.

BACKGROUND

Mechanical vapor recompression evaporator systems includes a falling film evaporator used to vapourize a small percentage of brine on the tube side and to condense a pure water stream on the shell side. Currently the vapourized steam and non-vapourized brine from the tube side fall into a vertical sump which is used to separate the brine from the steam, with the brine ultimately being pumped back to the tube side of the exchanger.

The vertical sump may be the same diameter as the falling film exchanger with the steam with carried-over brine directed to a separate knockout vessel to further remove brine carry-over. The steam is then directed to a compressor (potentially going through a demister pad) where the steam is then sent to the shell side of the falling film exchanger.

Alternately, the vertical sump may be significantly larger in diameter than the falling film exchanger. In this case, the larger sump also acts as the knockout vessel on the compressor suction, and may contain a demister pad on the annulus (ring of the knockout vessel that is outside the perimeter of the falling film exchanger). Again, the steam is sent to the shell side of the falling film exchanger.

In both cases, the falling film exchanger blowdown is taken as a slipstream of the recirculating brine going from the sump to the tube side of the falling film exchanger. This brine is withdrawn from the bottom of the sump. There is no other continuous brine withdrawal of fluids from the evaporator system.

There are several concerns with the above system:
1) Carryover of brine with the steam stream is a problem. In the case with the sump being greater in diameter than the falling film evaporator, any entrained brine in the steam stream will not be removed as the steam velocity increases as it goes from the evaporator sump to the compressor suction. A proposed solution has been to put a demisting screen on the annulus for the brine droplets to contact, coalesce and fall back into sump. In practice, the brine that coalesces on the demister screens evaporates leaving dissolved solids on the demister screen surface. The build-up of solids increases the pressure drop to unacceptable levels. One proposed solution to the solids build-up was to wash the screens using the clean produced water from the evaporator. This however reduces the capacity of the evaporator. In addition, brine carryover past the demister screen results in corrosion issues in the steam ducting to the compressor and to the compressor itself. In the case with the sump being equal in diameter to the falling film exchanger, the volume of the sump used for steam/brine separation is the same volume in which the brine drops from the falling film evaporator must pass in order to reach the brine liquid level. There is no undisturbed volume for good separation. Secondly, the diameter of the sump is based on the size of the falling film exchanger, and not based on the separation of steam from brine. Thirdly, the total volume of the sump is significantly reduced compared to the large sump case, which reduces the steam/brine and brine/hydrocarbon separation efficiency in the sump. The use of an external knock-out drum before the compressor reduces the impact of sump design since it will be designed for liquid/vapor separation. It generally has a demisting screen on the steam outlet similar to the large sump annulus screen, but suffers the same drawbacks of requiring a clean water wash to remove solids (reduced capacity), albeit this screen will be significantly reduced in size compared to the large diameter sump. Furthermore, the brine droplets passing through the demister will still have associated corrosion problems.
2) Hydrocarbon removal from the brine stream is problematic with both cases. Hydrocarbons in the system are normally lighter than brine and will tend to float to the top. The blowdown from the evaporator system is taken as a slipstream from the recirculating brine stream which is withdrawn from the sump at the bottom. As a result, there is a tendency for the hydrocarbons to accumulate (or at a minimum, concentrate) on top of the brine with little ability to reach the bottom of the sump where it can be blown down. The accumulation of hydrocarbons in the sump leads to foaming, additional brine carryover, and poor operation which then results in an evaporator shutdown to fully replace the brine (and accumulated hydrocarbon) with essentially hydrocarbon free brine.
3) The corollary to poor hydrocarbon removal is brine with higher hydrocarbon content. The additional hydrocarbon is not sufficient to reduce the hydrocarbon accumulation to zero, but will cause fouling and performance issues in the falling film exchanger. These are generally cleaned when the evaporator is shutdown for the hydrocarbon accumulation issues detailed in (2) above.

BRIEF SUMMARY

According to one aspect, there is provided a horizontal sump comprising at least one inlet, for connection to an evaporator, preferably a falling film evaporator, preferably the steam and water outlet of said falling film evaporator, said falling film evaporator having a tube side and a shell side; said horizontal sump further comprising at least one steam outlet for feeding steam to the evaporator compressor. In one embodiment, said steam and water from said falling film evaporator further comprises brine. In another embodiment, said steam and water from said falling film evaporator further comprises at least one hydrocarbon. Said at least one steam outlet preferably further comprises at least one wash tray, preferably a plurality of wash trays, or backing for washing any entrained brine from the steam prior to introduction to the evaporator compressor. Preferably said at least one tray is designed for low liquid flow rates and high gas flow rates. The horizontal sump acts as an evaporator sump, with a liquid residence time required for the recirculation of brine to the evaporator. The horizontal sump provides an initial brine/steam separation prior to the steam reaching the first outlet, performing the service normally done by a separate compressor suction drum. The horizontal sump provides suction for at least one brine recirculation pump, preferably a plurality of brine recirculation pumps, for use in the recirculation of brine to the tube side of the falling film evaporator. The horizontal sump further provides residence time, preferably substantially undisturbed residence time of the brine and hydrocarbon(s) (if present), improving the separation and ultimate removal of hydrocarbons from the brine.

In another embodiment, water is fed to the at least one wash tray from a slip stream from feed water to the falling film evaporator. Contaminated feed water from the wash trays drop into the liquid volume in the sump serving as feed water to the evaporator as well as for steam clean-up. If there is any liquid carryover from the at least one wash tray, the liquid composition will be substantially feed water rather than brine. In one embodiment a factor of about 40 times less contaminated and a pH closer to neutral compared to the pH of 10-11 of the brine.

In another embodiment, said horizontal sump further comprises at least one blowdown outlet, and at least one brine outlet. Preferably each of the steam, brine and blowdown outlets are distant the at least one falling film evaporator inlet. From the evaporator tubes is a stream comprising steam vaporizing from the recirculating brine and the unvaporized brine. The brine falls into the liquid in the sump, causing some mixing of the brine and hydrocarbon(s). The produced steam from the evaporator tubes must change direction to leave the sump, and travels through the falling brine increasing the tendency to carry-over brine droplets in the steam. By placing the at least one steam outlet distant the mixing and any turbulence caused by the falling brine, the horizontal sump improves the separation efficiency of the brine and steam for a given sized sump. In one embodiment, when the inlet feed to the evaporator contains small quantities of hydrocarbon(s), there will be a tendency for the hydrocarbon(s) to accumulate on the liquid surface in the sump. By placing the at least one brine outlet and the at least one blowdown outlet distant any turbulence zone in the sump caused by the falling brine, the horizontal sump further improves the separation of the hydrocarbon from the brine. The blowdown from the evaporator into the sump flows over an overflow weir, preferably a substantially vertical weir, in said sump, preferably said weir situated proximate said at least one brine outlet and said at least one blowdown outlet, more preferably between said at least one brine outlet and said at least one blowdown outlet, removing more of the separated hydrocarbon(s) from the sump, resulting in a cleaner brine stream (lower hydrocarbon content) preferably for recirculation to the tube side of the falling film evaporator.

In another embodiment, said horizontal sump comprises two steam and brine inlets, preferably one inlet from a low contaminant concentration falling film evaporator and the other inlet from a high contaminant concentration falling film evaporator.

Preferably when said horizontal sump comprises two steam and brine inlets, said horizontal sump comprises at least two brine outlets, preferably a low concentration brine outlet and a high concentration brine outlet.

Preferably when said horizontal sump comprises two steam and brine inlets, said horizontal sump comprises at least two overflow weirs, preferably for hydrocarbon overflow. Preferably each of said at least two overflow weirs are proximate said blowdown outlet, more preferably one weir is between the high concentration brine outlet and the blowdown outlet and the other weir is between the low concentration brine outlet and the blowdown outlet. One weir defining a low concentration zone in said sump and the other weir defining a high concentration zone in said sump.

In one embodiment, said weir defining said high concentration zone in said sump is shorter than said weir defining said low concentration zone in said sump.

More preferably, when said horizontal sump comprises two steam and brine inlets, said sump further comprises a flow control to control flow from the low concentration zone in said sump to the high concentration zone in said sump.

In yet another aspect, a process for providing high quality steam in an evaporative water purification system utilized in an oil recovery facility, comprises providing an evaporator, connected to a sump, employing a weir to divide the sump into a main sump and a blowdown sump, flowing brine including oil over the weir from the main sump into the blowdown sump, discharging the brine from the main sump and circulating the brine to the evaporator exchanger, discharging oil from the blowdown sump and removing same from the system, and discharging steam from the sump.

In yet another aspect, a process for providing a high quality steam in an evaporative water purification system utilized in an oil recovery facility, comprises providing a sump, connecting a low concentration evaporator to the sump, employing a first weir to divide the sump into a low concentration sump portion and a blowdown portion, connecting a high concentration evaporator to the sump, employing a second weir to divide the sump into a high concentration sump portion separated from the blowdown portion, flowing brine including oil from both the low concentration sump portion and the high concentration sump portion into the blowdown portion, discharging the oil from the blowdown sump, discharging brine from the low concentration blowdown sump and circulating the brine to the low concentration evaporator, discharging brine from the high concentration blowdown sump and circulating the brine to the high concentration evaporator, and discharging steam from the sump.

DETAILED DESCRIPTION OF THE PREFERRED EMBODIMENTS

Figure 1:
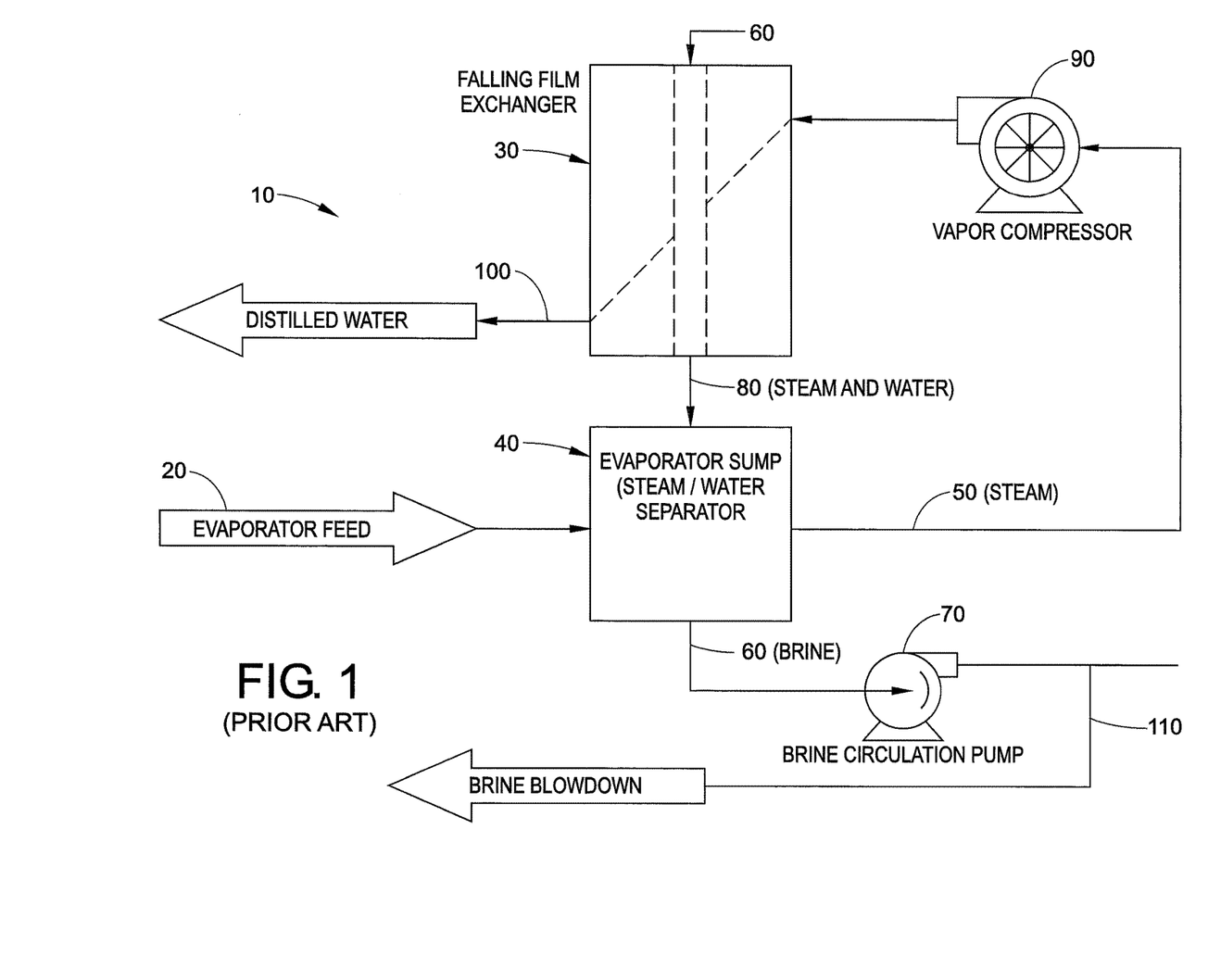
FIG. 1 is a schematic view of a typical mechanical vapour compression evaporator operation according to the prior art.

Referring now to FIG. 1, there is provided a schematic view of mechanical vapour compression ("MVC") evaporator system 10. An MVC evaporator is intended to remove water from a contaminated water source. It can be used to produce clean water as a product such as in a desalination plant or a SAGD treatment facility, or it can be used to concentrate components in an aqueous solution such as in pulp and paper, and mining applications. In the former case, the water recovered from the evaporator is the desired product and the concentrated brine is a waste stream. In the latter case, the concentrated brine is the desired product and the water stream is a waste stream. In both cases, the operation of the MVC evaporator is the same.

The feed 20 to the MVC evaporator system 10 is an aqueous solution containing either contaminants to be removed or product to be concentrated. It is fed into an evaporator sump 40. The sump 40 serves multiple purposes. It is the liquid hold-up in the system, separates immiscible liquids into two phases, and separates steam 50 from the liquid (brine) 60. Brine 60 from the sump is pumped via a pump 70 to the tube side of a falling film exchanger 30, where a small fraction of the brine is vapourized. The combined vapor and unvaporized brine 80 from the tube side of the exchanger falls by gravity back to the evaporator sump 40.

The steam produced 50 in the tube side of the evaporator 30 is separated in the sump 40, compressed via a compressor 90, and sent to the shell side of the falling film evaporator 30.

Because the steam is compressed, its saturation point is raised so that the condensation temperature of the steam is higher than the vaporization temperature of the brine on the tube side. This temperature difference drives the heat exchange. The steam that is condensed on the shell side is withdrawn from the falling film exchanger as the water product 100 (or as the water waste stream).

A slipstream of brine 110 from the evaporator sump 40 is removed (a slip stream from the brine circulation pump 70 or as a separate stream from the evaporator sump 40 (not shown). This is either a waste stream if clean water is the objective, or is the concentrated product stream if this is the objective.

Figure 2:
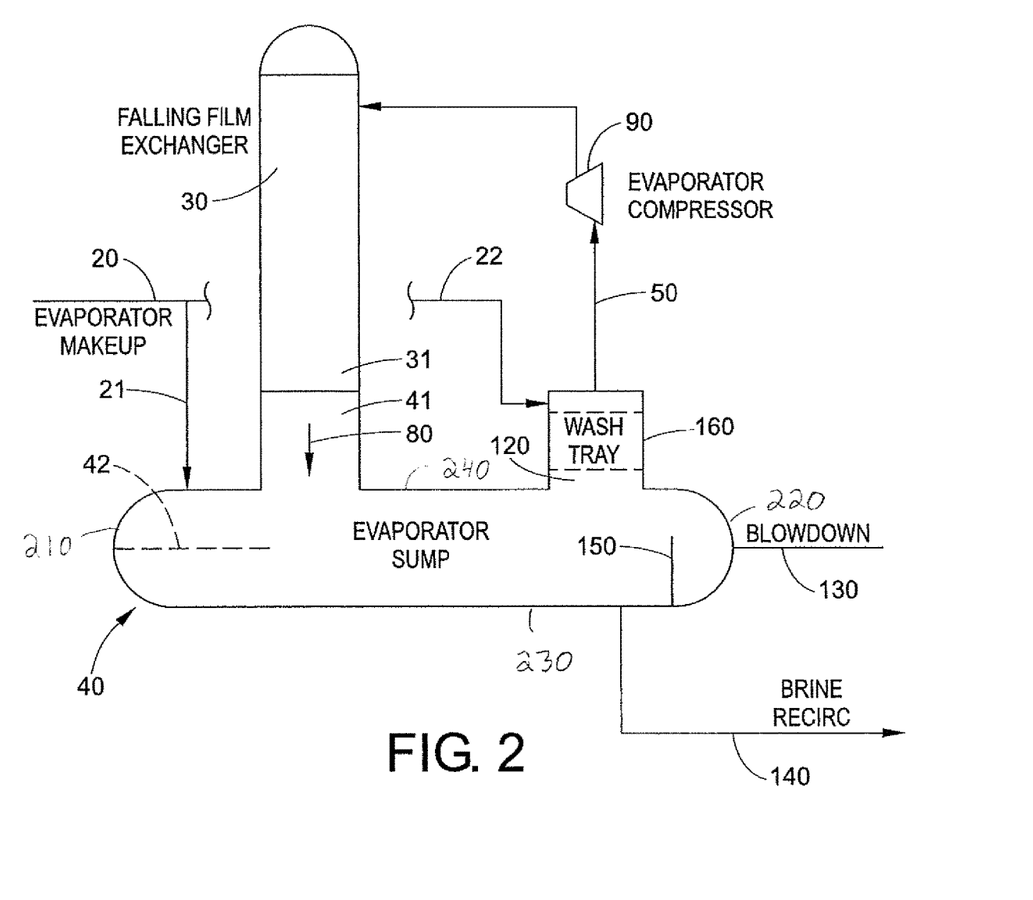
FIG. 2 is a schematic view of an embodiment according to the present disclosure of a single evaporator horizontal sump system.
Figure 3:
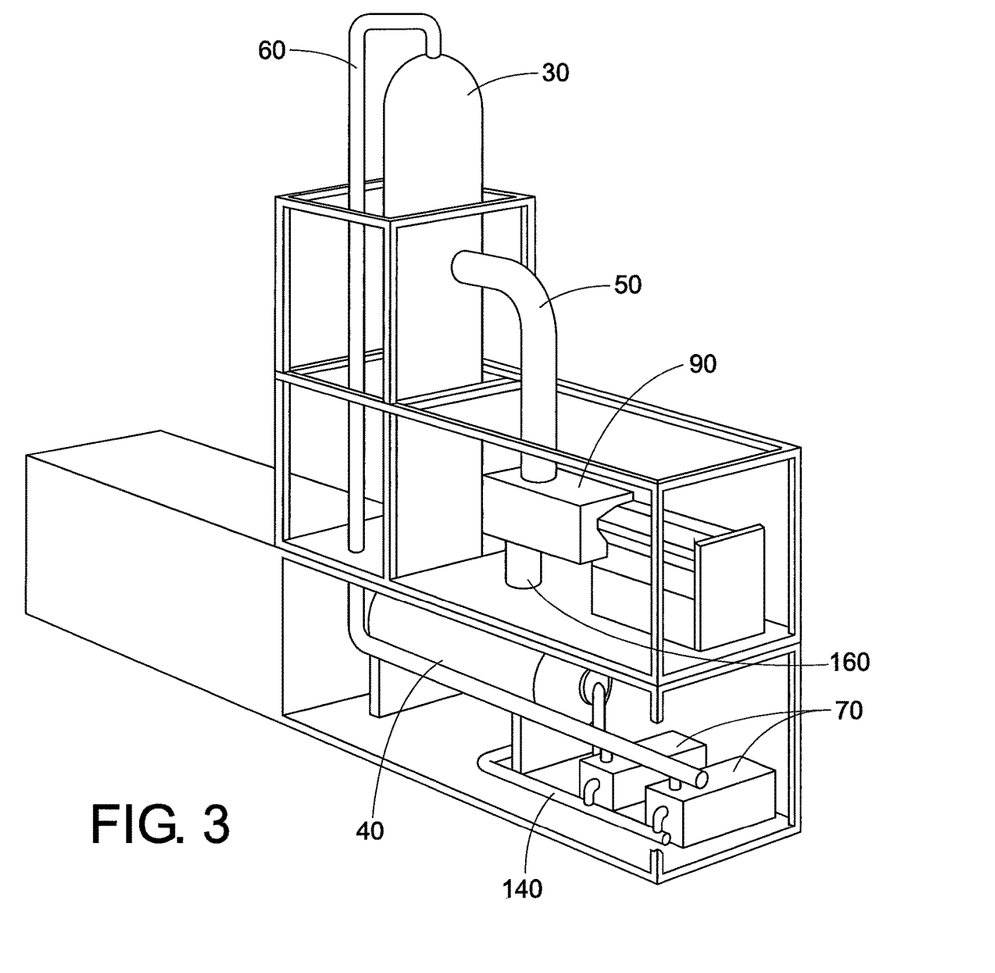
FIG. 3 is a perspective view of the system of FIG. 2.

Referring now to FIGS. 2 and 3, an evaporator sump 40 for a single exchanger 30 is shown. The single exchanger system is useful for smaller capacities. In this case the lower overall energy efficiency is offset by the simplicity (fewer pieces of equipment, lower capital cost, lower plot requirements) of the one exchanger design compared to the two tower system. In this instance, the evaporator described is for the purification of water, but applies equally to the concentration of an aqueous product.

The falling film exchanger 30 is placed directly over a nozzle 41 of the horizontal evaporator sump 40. The nozzle 41 on the sump 40 is the same diameter as the falling film exchanger outlet diameter 31 to ensure no restriction in flow in the falling film exchanger tubes and between the tubes and the liquid level 42 in the sump 40. In one embodiment, for a portable and modular system, the nozzle flange is set flush to the top of the sump.

The three outlet nozzles, steam 120, overflow blowdown 130 and brine 140 for the sump 40 are located on the opposite side of where the sump 40 is connected to the evaporator 30. At the end of the sump 40 between the overflow blowdown outlet 130 and the brine outlet 140, there is an overflow weir 150. On the downstream side of the weir 150 is the evaporator blowdown line 130. Because the weir is an overflow weir 150, any separated hydrocarbons in the sump 40 will flow over the weir 150 and be removed with the evaporator blowdown via line 130. The location of the weir 150 and an outlet of the blowdown line 130 results in an increased residence time of liquid within the sump 40 and away from any mixing caused by the brine 80 falling from the tube side of the falling film evaporator 30 into the sump 40, increasing the hydrocarbon/brine separation in the sump 40.

The brine outlet 140 comes off the bottom of the sump 40 on the upstream side of the weir 150. The location of the brine outlet 140 has been chosen to increase the residence time of liquid within the sump 40 and away from any mixing or turbulent zone caused by the brine 80 falling from the tube side of the falling film evaporator 30 into the sump 40, increasing the hydrocarbon/brine separation in the sump 40.

The steam outlet 120 is located on the top of the sump 40. It is also located on the upstream side of the weir 150. This location increases the vapor residence time within the sump 40 and is distant any mixing caused by the brine 80 falling from the tube side of the falling film evaporator 30 into the sump 40 increasing the vapor liquid separation in the sump 40. In one embodiment, for a portable and modular system, the nozzle flange of the steam outlet 120 is set flush to the top of the sump 40.

A diameter of the steam outlet will be set by the desired diameter of the wash trays located directly above the steam nozzle flange. The wash trays 160 are similar in design to trays commonly designed for amine and caustic systems (located on top of amine and caustic towers to minimize losses of amine or caustic). The wash tray can comprise one or more conventional trays, one or more high efficiency trays, layers of random packing, or layers of structured packing material. In this case, the wash water will be a slip stream 22 of the evaporator feed stream 20 but could also be utility water, boiler feed water or any other source of relatively clean water. The contaminated water from the bottom of the wash trays 160 fall into the brine in the sump 40 (with the steam nozzle 120 located upstream of the overflow weir 150 reducing any mixing of this contaminated water with the evaporator blowdown stream 130). The steam 50 from the steam outlet passes through the wash trays 160 and into the steam inlet line to the compressor 90. Any entrained brine entering with the steam mixes with the water on the wash trays 160 and is returned to the evaporator sump 40. Any entrained liquids in the steam from the top of the wash trays will essentially be the composition of the feed water and the contaminant concentration will be reduced. In one embodiment it is reduced by about a factor of 40 times. Since it is the carryover of brine droplets and subsequent deposition of salt deposits on the steam piping and compressor that causes significant corrosion issues in these areas, this reduction in the amount of entrained liquids and in the concentration of contaminants in the entrained liquids reduces the corrosion potential in the steam lines and compressor.

Figure 4:
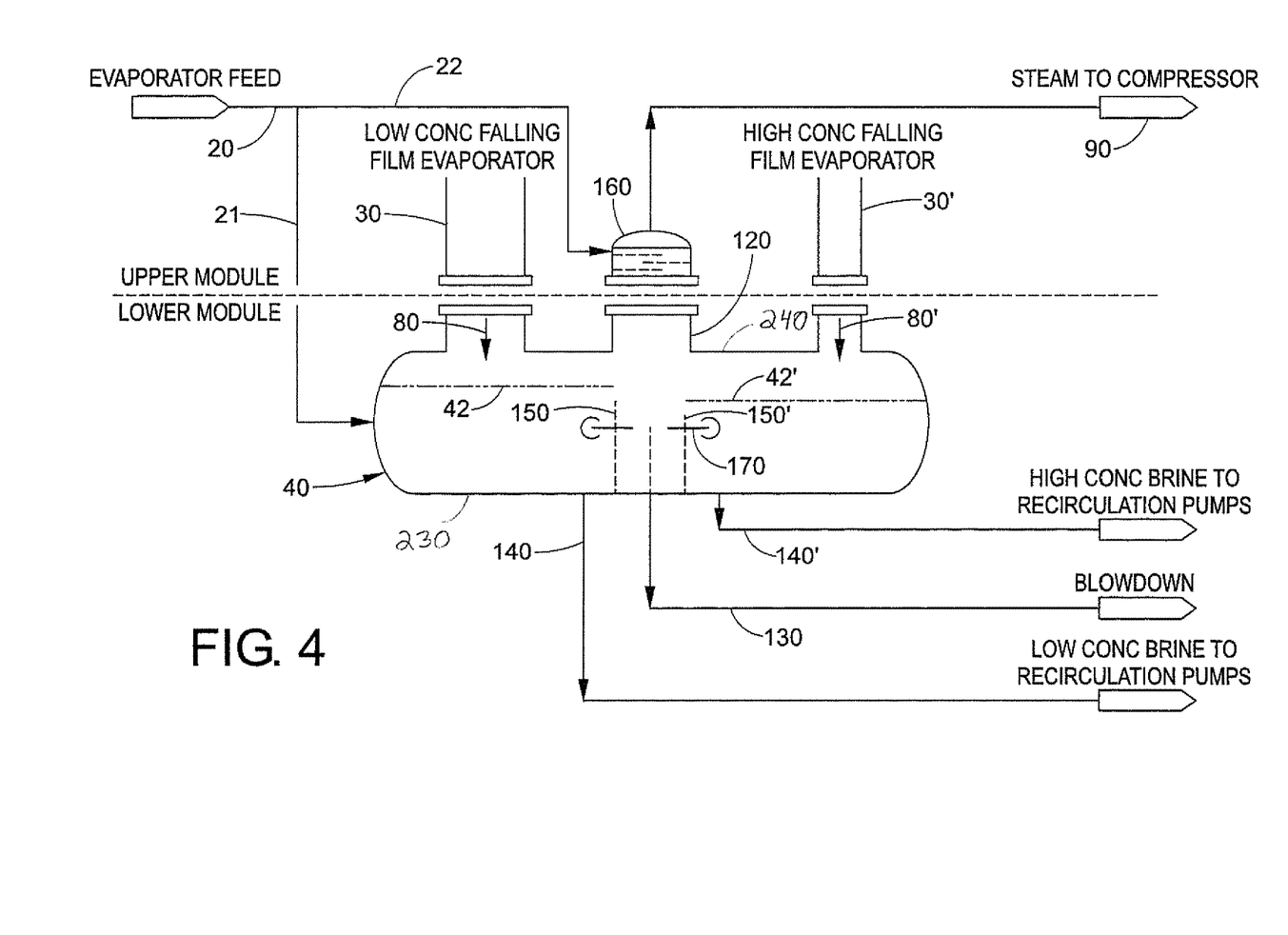
FIG. 4 is a schematic view of an embodiment according to the present disclosure of a dual evaporator horizontal sump system.
Figure 5:
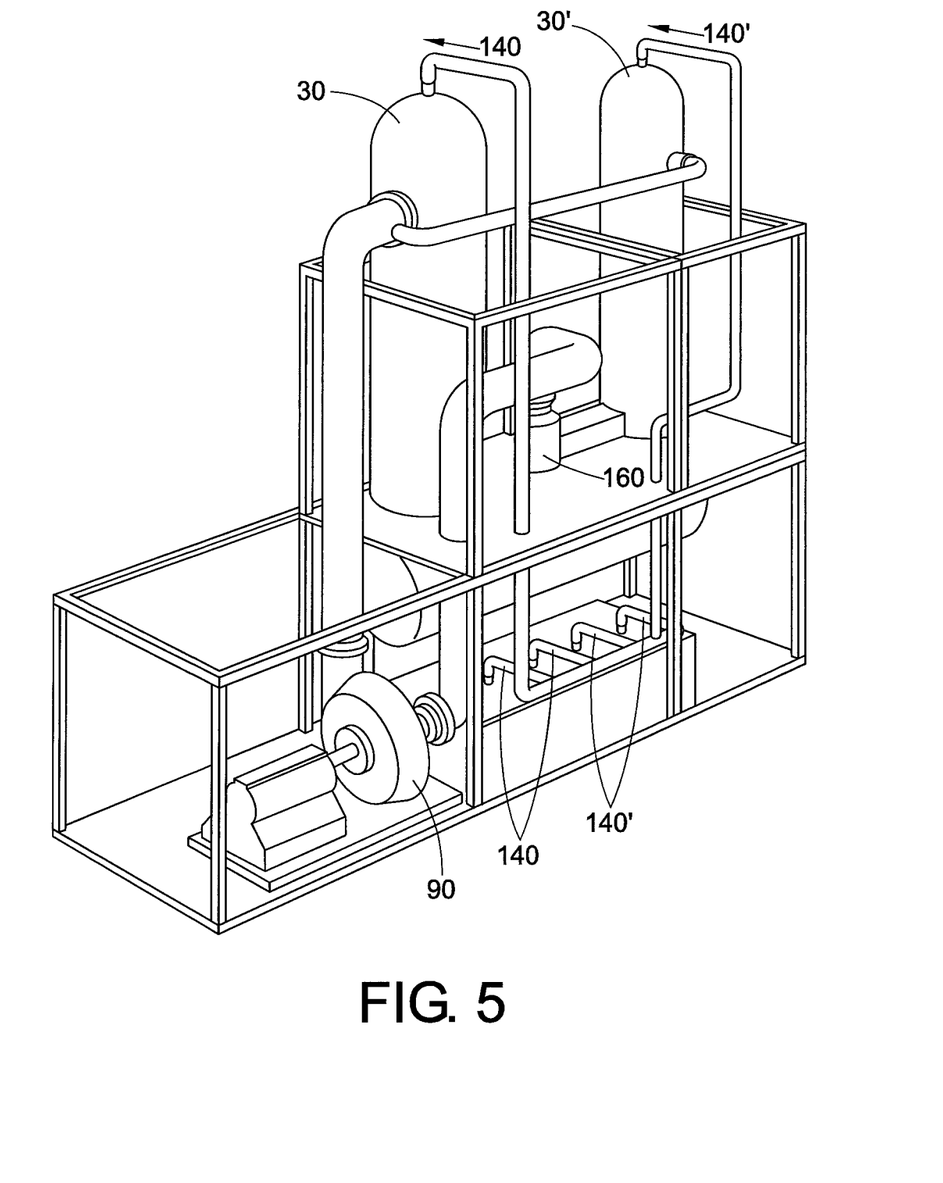
FIG. 5 is a perspective view of the system of FIG. 4.

Referring now to FIGS. 4 and 5, a two evaporator exchanger design is shown. The two evaporator exchanger system is suitable for larger facilities where the decrease in operating cost and improved reliability offset the increased equipment cost and capital cost of a single evaporator design. This design also increases the maximum capacity for a portable and modular design. In this instance, the evaporator described will be for the purification of water, but applies equally well to the concentration of an aqueous product. It also describes a two tower design with a larger low concentration exchanger and a smaller high concentration exchanger, but can be adapted to two parallel exchangers.

Two falling film exchangers, a low concentration exchanger 30, and a high concentration exchanger 30' are placed on opposite top sides of a single horizontal evaporator sump 40 with a steam outlet 120 located inbetween. As with the single exchanger, the outlets on the horizontal sump 40 match the respective diameters of the falling film exchangers 30, 30' to ensure no restriction in flow in the falling film exchanger tubes and between the tubes and the liquid level 42, 42' in the sump. In a portable and modular system, the nozzle flanges are set flush to the top of the sump 40.

In this embodiment, the outlet for the low concentration brine recirculation 140, the high concentration brine recirculation 140', the steam 120, and the evaporator blowdown 130 are located proximate the middle of the sump 40. While the outlets 120, 130, 140 and 140' are situated between the two exchangers 30, 30', in this instance they are placed closer to the high concentration exchanger 30' since the low concentration exchanger 30 will have a higher steam and brine flow compared to the high concentration exchanger 30'. In this instance, there are two overflow weirs in the vessel. A higher weir 150 is situated on the low concentration side of the sump 40 to remove a concentrated hydrocarbon stream into the blowdown 130 from the low concentration side of the sump 40. This stream should be minimized to reduce, preferably minimize the loss of low concentration brine to the blowdown sump. The lower weir 150' is situated on the high concentration side of the sump 40 from which the majority of the blowdown 130 will be taken. A balance line 170 with a control valve and a flow indicator (not shown) will go from the low concentration side of the weir to the high concentration side of the weir. This flow is used to set the level 42 in the low concentration side of the sump 40. The blowdown 130 line will be taken from the blowdown sump located between the two overflow weirs 150 and 150'. The location of the blowdown line increases the separation of hydrocarbon and water in the exchanger sump, increasing the amount of hydrocarbon in the blowdown 130 and decreasing the amount of hydrocarbon in the recirculating brine streams 140 and 140'.

The brine recirculation lines 140 and 140' come off the bottom of the sump 40 on the upstream sides of the weirs 150 and 150'. The location of these lines increase the residence time of liquid within the sump 40 and decreases contact from any mixing caused by the brine falling from the tube side of the falling film evaporators 30 and 30' into the sump 40, increasing the hydrocarbon/brine separation in the sump 40.

The steam outlet 120 is located on the top of the sump 40, and on the downstream side of the low concentration weir 150. This location increases the vapor residence time within the sump 40 and minimizes contact with any mixing caused by the brine falling from the tube side of the falling film evaporator 30 into the sump 40, increasing the vapor liquid separation in the sump 40. Neither of the two weirs 150, 150' in the sump 40 extend to the top of the sump, the steam from both evaporator exchangers feed this common steam outlet 120. In a portable and modular system, the steam outlet 120 is set flush to the top of the sump 40.

The diameter of the steam outlet 121 is set by the desired diameter of wash trays 160 located directly above the steam outlet 120. The wash trays 160 are of similar design to trays commonly designed for amine and caustic systems (located on top of amine and caustic towers to minimize losses of amine or caustic). The wash tray can comprise one or more conventional trays, one or more high efficiency trays, layers of random packing, or layers of structured packing material. In this case, the wash water will be a slip stream 22 of the evaporator feed stream 20 but could also be utility water, boiler feed water or any other source of relatively clean water. The contaminated water from the bottom of the wash trays will fall into the brine (with the steam outlet located upstream of the overflow weir to ensure this contaminated water is not mixed with the evaporator blowdown stream).

The steam from the steam outlet passes through the wash trays 160 and into the steam inlet line to the compressor 90. Any entrained brine entering with the steam will mix with the water 22 on the wash trays 160 and be returned to the low concentration side of the evaporator sump 40. Any entrained liquids in the steam from the top of the wash trays 160 will essentially be the composition of the feed water 20 and the contaminant concentration will be reduced (in one embodiment by about a factor of 40 times). Since it is the carryover of brine droplets and subsequent deposition of salt deposits on the steam piping and compressor that causes significant corrosion issues in these areas, this reduction in the amount of entrained liquids and in the concentration of contaminants in the entrained liquids reduce the corrosion potential in the steam lines and compressor.

As many changes can be made to the preferred embodiment of the invention without departing from the scope thereof; it is intended that all matter contained herein be considered illustrative of the invention and not in a limiting sense.

The invention claimed is:

1. An evaporator system for producing a cleaned steam, comprising:
    a horizontal sump including a first end, a second end, a top and a bottom;
    a first inlet located on the top of the sump for receiving steam and contaminated water;
    a steam outlet located on the top of the sump and horizontally spaced from the inlet for feeding steam to a compressor;
    a wash tray located on the top of the sump and positioned above the steam outlet for washing entrained brine from the steam prior to a flow of the steam to the compressor; and
    a falling film evaporator mounted to the sump at the first inlet.

2. The evaporator system of claim 1 further comprising a blowdown outlet located on the second end of the sump.

3. The evaporator system of claim 2 further comprising a brine outlet located on the bottom of the sump and spaced from the blowdown outlet.

4. The evaporator system of claim 3 further comprising an overflow weir located in the sump and extending from the bottom of the sump and positioned between the brine outlet and the blowdown outlet.

5. The evaporator system of claim 1 further comprising a second inlet for receiving steam and contaminated water located on the top of the sump, the second inlet being horizontally spaced from the first inlet and the steam outlet.

6. The evaporator system of claim 1 wherein the first inlet of the sump has the same diameter as a diameter of the falling film evaporator.

7. The evaporator system of claim 4 wherein said overflow weir is vertical in orientation.

8. The evaporator system of claim 5 further comprising first and second falling film evaporators, wherein said first inlet is connected to the first falling film evaporator and said second inlet is connected to the second falling film evaporator.

9. The evaporator system of claim 8 further comprising two spaced brine outlets located on the bottom of the sump.

10. The evaporator system of claim 9 further comprising a first overflow weir and a second overflow weir spaced from the first overflow weir, wherein the first and second overflow weirs are located in the sump.

11. The evaporator system of claim 10 wherein the first overflow weir and the second overflow weir are located on opposed sides of a blowdown outlet of the sump.

12. The evaporator system of claim 11 wherein the first overflow weir is located between a first of the two spaced brine outlets and the blowdown outlet and the second overflow weir is located between a second of the two spaced brine outlets and the blowdown outlet.

13. The evaporator system of claim 10 wherein the first and second overflow weirs are vertically oriented and wherein the second overflow weir is shorter than the first overflow weir.

14. The evaporator system of claim 8 further comprising a flow control to control flow from a first zone in said sump to a second zone in said sump.

15. The evaporator system of claim 13 wherein said sump further comprises a flow control to control flow from a first zone in said sump to a second zone in said sump.

16. A mechanical vapor compression evaporator system for producing cleaned steam, comprising:
   a horizontal sump including a first inlet, a steam outlet horizontally spaced from the first inlet, a brine outlet and a blowdown outlet wherein the brine outlet and blowdown outlet are horizontally spaced from each other and wherein the brine outlet and blowdown outlet are vertically spaced from the first inlet and the steam outlet;
   a wash tray positioned adjacent the steam outlet;
   a weir located in the sump and positioned between the brine outlet and the blowdown outlet;
   a compressor located downstream from and fluidly connected to the steam outlet;
   a wash water supply fluidly connected to the wash tray for cleaning the wash tray; the wash water supply being located downstream from the wash tray and upstream from the compressor; and
   wherein the steam outlet is located upstream from the weir.

17. The evaporator system further comprising a falling film evaporator mounted to the sump at the first inlet.

18. The evaporator system of claim 17 wherein a diameter of the first inlet is equal to a diameter of the falling film evaporator.

19. The evaporator system of claim 16 wherein the blowdown outlet is located downstream from the weir.

20. The evaporator system of claim 19 wherein the brine outlet is located upstream from the weir.

* * * * *